(12) United States Patent
Watanabe et al.

(10) Patent No.: US 8,332,187 B2
(45) Date of Patent: Dec. 11, 2012

(54) CANTILEVER EVALUATION SYSTEM, CANTILEVER EVALUATION METHOD, AND CANTILEVER EVALUATION PROGRAM

(75) Inventors: Naoki Watanabe, Tokyo (JP); Masaru Tsukada, Tokyo (JP)

(73) Assignees: Mizuho Information & Research Institute, Inc. (JP); Waseda University (JP)

(*) Notice: Subject to any disclaimer, the term of this patent is extended or adjusted under 35 U.S.C. 154(b) by 310 days.

(21) Appl. No.: 12/677,607

(22) PCT Filed: Oct. 22, 2008

(86) PCT No.: PCT/JP2008/069155
§ 371 (c)(1),
(2), (4) Date: Mar. 11, 2010

(87) PCT Pub. No.: WO2009/054417
PCT Pub. Date: Apr. 30, 2009

(65) Prior Publication Data
US 2010/0204968 A1    Aug. 12, 2010

(30) Foreign Application Priority Data
Oct. 26, 2007   (JP) .................................. 2007-279315

(51) Int. Cl.
*G06F 17/50*    (2006.01)
(52) U.S. Cl. .............................................. 703/1; 850/33
(58) Field of Classification Search ....................... 703/1
See application file for complete search history.

(56) References Cited

U.S. PATENT DOCUMENTS

| | | | | |
|---|---|---|---|---|
| 6,452,170 | B1* | 9/2002 | Zypman et al. | 850/33 |
| 6,530,266 | B1* | 3/2003 | Adderton et al. | 73/105 |
| 7,288,404 | B2* | 10/2007 | Vafai et al. | 435/287.1 |
| 7,441,444 | B2* | 10/2008 | Hoh | 73/105 |
| 7,992,431 | B2* | 8/2011 | Shih et al. | 73/105 |

FOREIGN PATENT DOCUMENTS

| | | |
|---|---|---|
| EP | 1830171 A1 | 9/2007 |
| JP | 05071951 | 3/1993 |
| JP | 11118813 | 4/1999 |

(Continued)

OTHER PUBLICATIONS

Song et al, "Finite-Element Vibration Analysis of Tapping-Mode Atomic Force Microscopy in Liquid", Ultramicroscopy 107, pp. 1095-1104, Oct. 2007, Available Online May 8, 2007.*

(Continued)

*Primary Examiner* — Mary C Jacob
(74) *Attorney, Agent, or Firm* — Caesar, Rivise, Bernstein, Cohen & Pokotilow, Ltd.

(57) ABSTRACT

A controller of a cantilever evaluation system calculates a stream function value $\psi z(x, y; t+1)$ and vorticity $\omega z(x, y; t+1)$ at a subsequent time step t+1 using boundary conditions according to displacement $h(z; t)$ of a cantilever and velocity $\partial h/\partial t(z; t)$, a stream function value $\phi z(x, y; t)$ and vorticity $\omega z(x, y; t)$ in two-dimensional planes. The controller uses the calculated stream function value $\phi z(x, y)$ and vorticity $\omega z(x, y)$ to calculate a fluid drag force acting on the cantilever. The controller substitutes the calculated fluid drag force into a displacement calculation equation to calculate the displacement $h(z; t+1)$ of the one-dimensional beam at the subsequent time step t+1. The controller repeats such calculation for each grid point and further repeats it at each time step.

6 Claims, 10 Drawing Sheets

FOREIGN PATENT DOCUMENTS

JP      2007271318      10/2007
WO      2006049120 A1    5/2006

OTHER PUBLICATIONS

Martin et al, "Dynamic Simulation of Atomic Force Microscope Cantilevers Oscillating in Liquid", Journal of Applied Physics, 104, 2008, published online Aug. 28, 2008.*

Sader et al, "Frequency Response of Cantilever Beams Immersed in Viscous Fluids with Applications to the Atomic Force Microscope", Journal of Applied Physics, vol. 84, No. 1, Jul. 1, 1998.*

Van Eysden et al, "Frequency Response of Cantilever Beams Immersed in Viscous Fluids with Applications to the Atomic Force Microscope: Arbitrary Mode Order", Journal of Applied Physics 101, 2007.*

International Preliminary Report on Patentability for PCT/JP2008/069155 issued Jun. 1, 2010.

International Search Report for PCT/JP2008/069155.

Tsukada, "Ekichu SPM no Riron Kaiseki to Kadai (Theoretical Analysis and Problems of SPM in Liquid)", 2007 Nen (Heisei 19 Nen) Shunki 54th Extended Abstracts, Japan Society of Applied Physics and Related Societies, Mar. 27, 2007, separate vol. 0, p. 68.

Anczykowski, et al., Cantilever dynamics in quasinoncontact force microscopy: Spectroscopic aspects, Physical Review B, Jun. 15, 1996, vol. 53, No. 23, p. 15485-15488.

* cited by examiner

Fig.13(a) Fig.13(b)
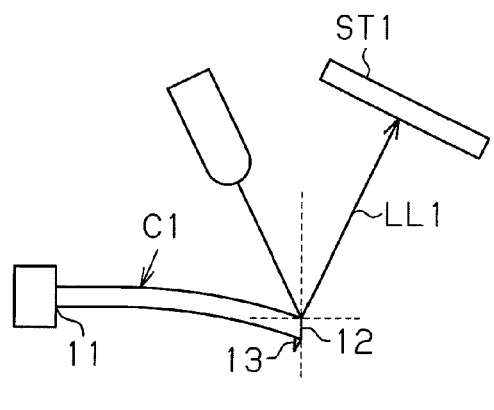
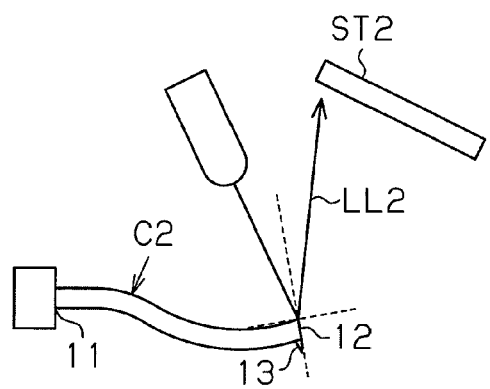
Fig.14
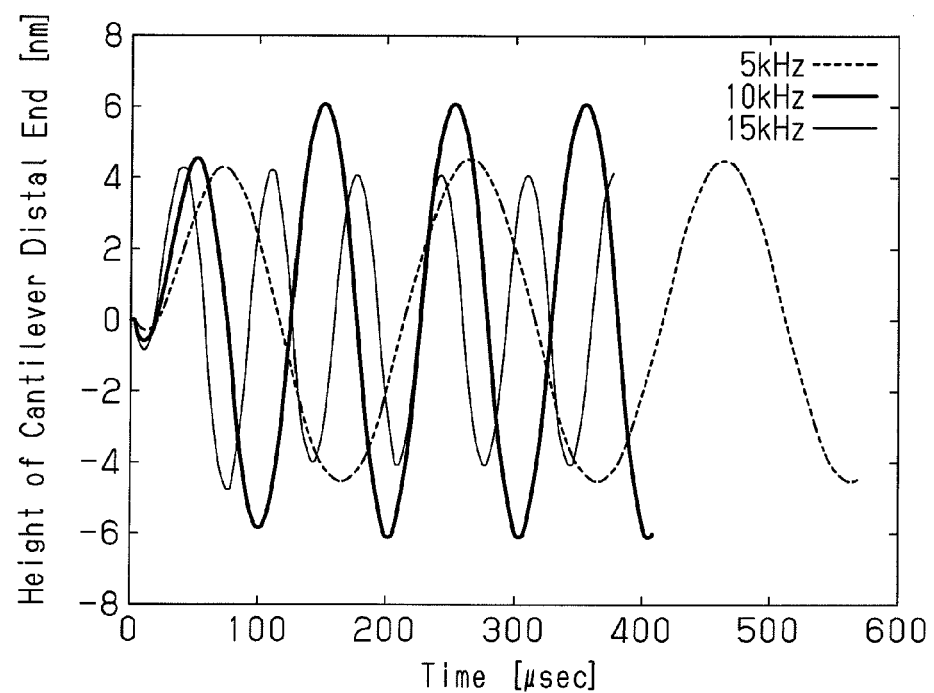

CANTILEVER EVALUATION SYSTEM, CANTILEVER EVALUATION METHOD, AND CANTILEVER EVALUATION PROGRAM

FIELD OF THE INVENTION

The present invention relates to a cantilever evaluation system, a cantilever evaluation method, and a cantilever evaluation program. A computer uses the present invention to perform numerical simulation analysis of vibration characteristics of a cantilever in a fluid. The present invention aids the design of a cantilever.

BACKGROUND OF THE INVENTION

A scanning probe microscope (SPM) is used to measure fine shapes and properties of the surface of a sample. The scanning probe microscope brings a probe close to the sample to measure an atomic force (attraction and repulsion), tunnel current, and other physical phenomena between the probe and the sample. The scanning probe microscope can thus measure the shapes and properties of the surface of the sample at the atomic level.

The scanning probe microscope described in Patent Document 1 includes a cantilever and a probe provided at the distal end of the cantilever. In such a scanning probe microscope, upward and downward movements of the probe are measured by illuminating the rear side of the cantilever with laser light and measuring the laser light reflected off the rear side of the cantilever. That is, the motion of the cantilever affects the measurement accuracy of the probe.

A scanning probe microscope is used in a vacuum environment in many cases. Numerical simulation analysis has conventionally been performed on vibration/deformation characteristics of a cantilever alone in a vacuum or atmospheric environment.

On the other hand, objects measured under a scanning probe microscope have diversified into many types. For example, it is necessary in the biological field to measure objects in aqueous solutions. The atomic force microscope (AFM) described in Patent Document 2 measures a sample in a solution. Vibration/deformation characteristics of a cantilever in an aqueous solution may change when a large fluid drag force is applied to the cantilever.

No comprehensive numerical simulation has been made on a cantilever of an atomic force microscope when the cantilever is immersed in an aqueous solution. Only interaction between a probe at the distal end of the cantilever and a sample or a substrate has been computed. The sample is placed on the substrate, and the probe measures a shape of the sample present on the substrate.

Although a large number of numerical simulations have been made on fluids, they have not been considered in combination with elastic deformation of a cantilever, which is an obstacle for a fluid.

In conventional numerical simulations, the contact height indicating the position where the probe comes into contact with a sample is handled as a measurement value that directly relates to a measurement signal. An actual measurement signal, however, represents the position of the spot of reflected laser light with which the distal end of the cantilever is illuminated. That is, conventional numerical simulations do not conform to actual measurement situations.

Patent Document 1: Japanese Laid-Open Patent Publication No. 5-71951

Patent Document 2: Japanese Laid-Open Patent Publication No. 11-118813

DISCLOSURE OF THE INVENTION

An objective of the present invention is to provide a cantilever evaluation system capable of evaluating the behavior of a cantilever in a fluid. As a result, highly precise measurement can be made when a cantilever is designed and a measurement signal from a deformed cantilever is analyzed. Another objectives of the present invention is to provide a cantilever evaluation method and a cantilever evaluation program.

According to one aspect of the present invention, a cantilever evaluation system is provided. The cantilever evaluation system comprises a parameter storage, a grid coordinate data storage, a fluid distribution data storage, and a controller. A cantilever has a proximal end and a distal end. The parameter storage stores a structural parameter based on the shape of the cantilever, a material physical property of the material of the cantilever, and a fluid physical property value of fluid around the cantilever. The grid coordinate data storage stores data on displacement of each grid point. The grid points are distributed along the longitudinal direction of a one-dimensional structure into which the cantilever is modeled. The fluid distribution data storage stores data on the distribution of the fluid in each of a plurality of vertical planes. The vertical planes contain the respective grid points and are perpendicular to the longitudinal direction. The controller calculates vibration characteristics of the cantilever. The controller includes a proximal end displacement managing section, an object-to-be-computed identifying section, a fluid motion calculating section, a fluid drag force calculating section, a coordinate calculating section, and a time step processing section. The proximal end displacement managing section stores, in the grid coordinate data storage, displacement of the proximal end produced when a forced vibration is applied to the proximal end for each of a plurality of time steps. The time steps include a preceding time step, a current time step, and a subsequent time step in which order time elapses. The object-to-be-computed identifying section identifies a grid point to be computed from the plurality of grid points. The vertical plane containing the grid point to be computed is a plane to be computed. For the identified grid point, the fluid motion calculating section acquires the displacement of the grid point at the preceding time step from the grid coordinate data storage and uses the acquired displacement as a boundary condition. The fluid motion calculating section uses the fluid physical property value and the corresponding fluid distribution stored in the fluid distribution data storage to calculate the fluid distribution in the plane to be computed. The fluid drag force calculating section uses the fluid distribution in the plane to be computed and the fluid physical property value to calculate a fluid drag force. The coordinate calculating section calculates the coordinate of the grid point to be computed by using the fluid drag force, the structural parameter, and the material physical property value to calculate the equation of motion for the one-dimensional structure. The coordinate calculating section stores the calculated coordinate in the grid coordinate data storage. The time step processing section causes the fluid motion calculating section, the fluid drag force calculating section, and the coordinate calculating section to repeatedly calculate the coordinate for each grid point to be computed.

According to another aspect of the present invention, a cantilever evaluation method for causing a computer to calculate vibration characteristics of a cantilever is provided. The computer includes a parameter storage, a grid coordinate data storage, and a fluid distribution data storage. The cantilever has a proximal end and a distal end. The cantilever evaluation method comprises: storing in the parameter storage a structural parameter based on the shape of the cantilever, a material physical property value of the material of the cantilever, and a fluid physical property value of fluid around the cantilever; and storing data on displacement of each grid point in the grid coordinate data storage, the grid points being distributed along the longitudinal direction of a one-dimensional structure into which the cantilever is modeled. The cantilever evaluation method further comprises: storing data on the distribution of the fluid in each of a plurality of vertical planes in the fluid distribution data storage, the vertical planes each containing one or more of the grid points and being perpendicular to the longitudinal direction; storing displacement of the proximal end produced when a forced vibration is applied to the proximal end in the grid coordinate data storage for each of a plurality of time steps, the plurality of time steps including a preceding time step, a current time step, and a subsequent time step in which order time elapses; and identifying a grid point to be computed from the plurality of grid points, the vertical plane containing the grid point to be computed being a plane to be computed. The cantilever evaluation method further comprises: for the identified grid point, acquiring the displacement of the grid point at the preceding time step from the grid coordinate data storage, using the acquired displacement as a boundary condition, and using the fluid physical property value and the corresponding fluid distribution stored in the fluid distribution data storage to calculate the fluid distribution in the plane to be computed; using the fluid distribution in the plane to be computed and the fluid physical property value to calculate a fluid drag force; and calculating the coordinate of the grid point to be computed by using the fluid drag force, the structural parameter, and the material physical property value to calculate the equation of motion for the one-dimensional structure, and storing the calculated coordinate in the grid coordinate data storage. The cantilever evaluation method further comprises repeatedly calculating the coordinate for each grid point to be computed.

According to another aspect of the present invention, a cantilever evaluation program causing a computer to carry out the cantilever evaluation method is provided.

BRIEF DESCRIPTION OF THE DRAWINGS

FIG. 13($a$) is a front view showing a deformed cantilever and a reflected spot when the frequency of vibration is lower than a resonant frequency;

FIG. 13($b$) is a front view showing a deformed cantilever and a reflected spot when the frequency of vibration is high;

FIG. 14 shows a graph representing the temporal changes in height of the cantilever distal end for forced-vibration frequencies of 5 kHz, 10 kHz, and 15 kHz;

DETAILED DESCRIPTION OF THE PREFERRED EMBODIMENTS

Figure 1:
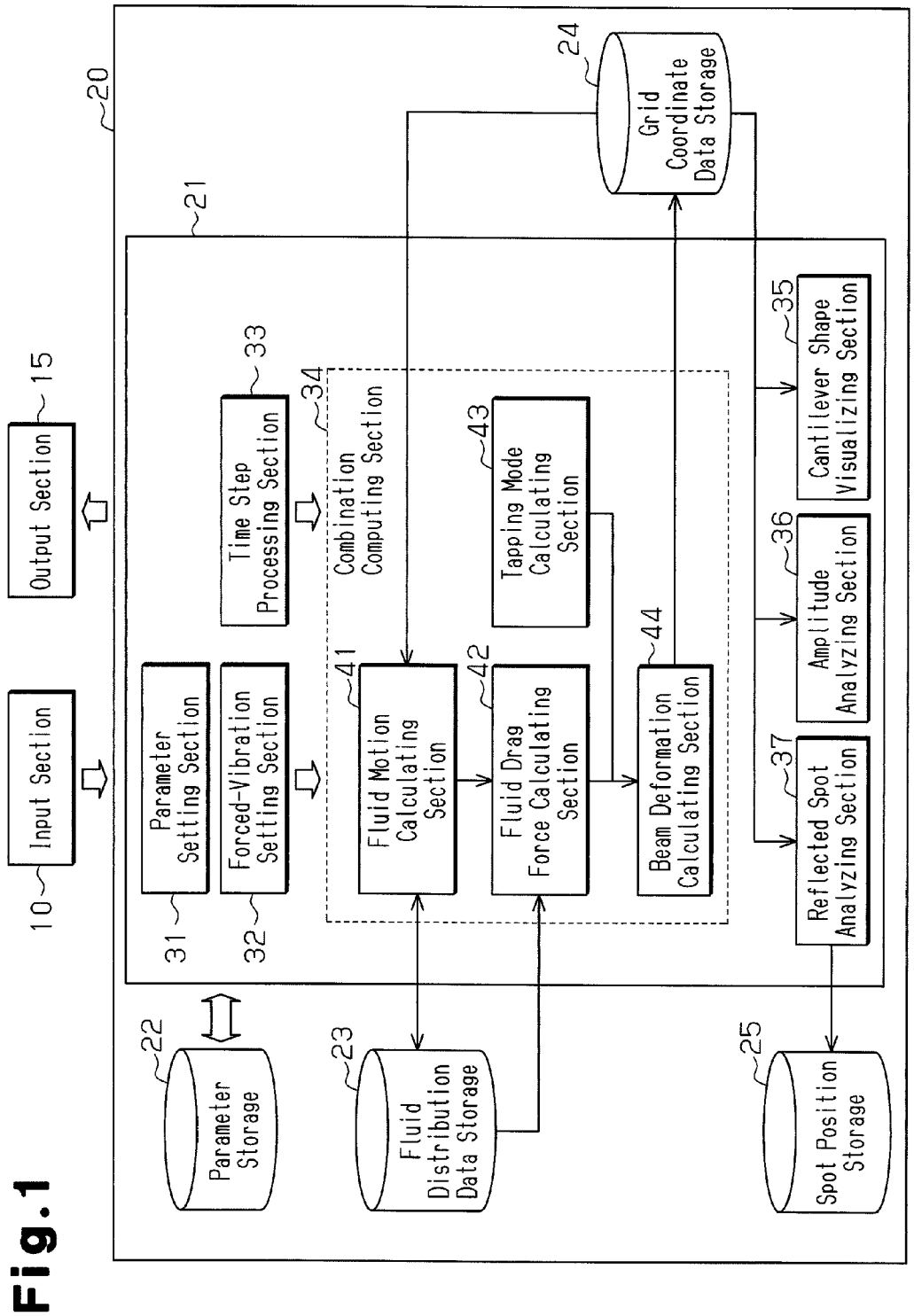
FIG. 1 is a block diagram of a cantilever evaluation system according to one embodiment in which the present invention is embodied.

FIGS. 1 to 16 show one embodiment of the present invention. FIG. 1 shows a cantilever evaluation system 20 according to the embodiment. A scanning probe microscope measures vibration characteristics of a cantilever C in an aqueous solution. The cantilever evaluation system 20 evaluates the vibration characteristics of the cantilever C by simulating and analyzing them. Results of the evaluation of the vibration characteristics are used to design a cantilever C capable of highly precise measurement. The results of the evaluation of the vibration characteristics are also used to analyze a measurement signal in consideration of deformation of the cantilever C.

Figure 5:
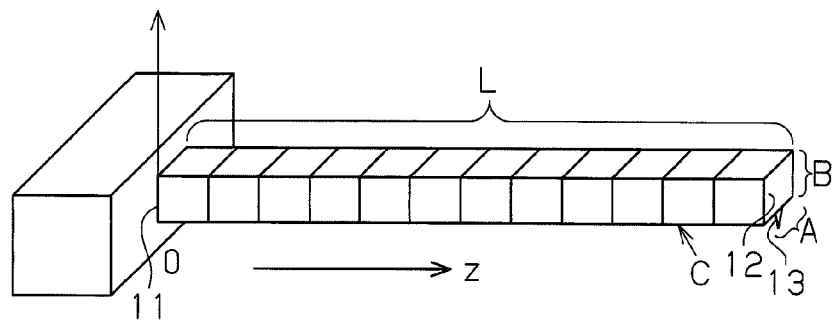
FIG. 5 is a perspective view of a one-dimensional elastic beam model of a cantilever used in the simulation shown in FIG. 2.

In the simulation, the cantilever C is modeled into a one-dimensional structure (one-dimensional beam) extending in a Z-axis direction, as shown in FIG. 5. In the modeling process, the second moment of area I(z) and the cross-sectional area S(z) of the cantilever C are set in consideration of the cross-sectional shape of the cantilever C. The cantilever C is assumed to be slightly displaced (deflected) in an X-axis direction. The cantilever C has a proximal end 11 as a fixed end and a distal end 12 as a free end. A probe 13 can be attached to the distal end 12.

Figure 6:
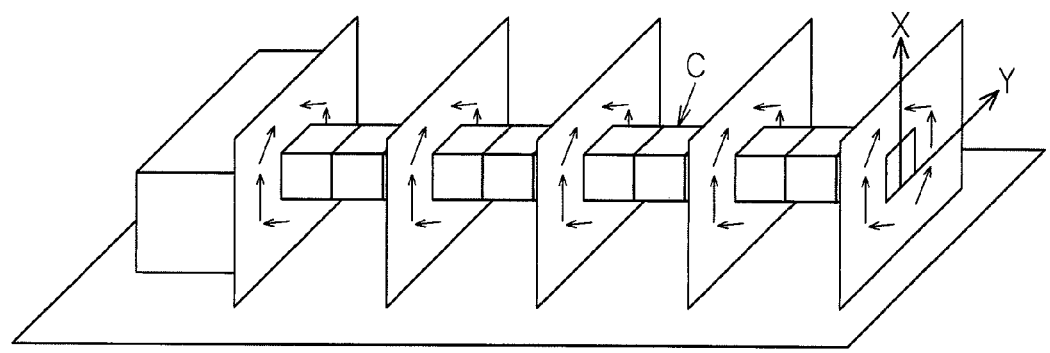
FIG. 6 is a perspective view of a two-dimensional fluid model of a liquid around the cantilever shown in FIG. 5.

The liquid around the cantilever C is modeled into an incompressible viscous fluid, as shown in FIG. 6. The liquid is assumed to flow in the following manner. The liquid flows substantially uniformly in the Z-axis direction. The component of the liquid flowing in the Z direction is ignored. It is assumed that the liquid flows in a limited two-dimensional plane (XY plane) of a cross-sectional plane perpendicular to the direction in which the cantilever C extends (Z-axis direction).

The equation of vibrational motion of the modeled cantilever C is combined with the equation of motion for the liquid around the cantilever C, which is considered as a two-dimensional fluid. The combination allows the temporal change in height of the distal end 12 of the cantilever C and the temporal change in inclination of the distal end 12 to be computed. As a result, the steady amplitude of the cantilever C is calculated.

The cantilever evaluation system 20 includes an input section 10 and an output section 15, as shown in FIG. 1.

An operator operates the input section 10 to input simulation conditions and parameters to the cantilever evaluation system 20. The simulation conditions include forced-vibration setting data and mode setting data. The parameters include physical property values of the material of the cantilever C, physical property values of the liquid, and shape-related values of the cantilever C. The physical property values of the material of the cantilever C include the material density $\rho b$ and Young's modulus E of the cantilever C. The physical property values of the liquid include the liquid density $\rho L$ and the viscosity $\mu$. The shape-related values of the cantilever C include the width A, the height B, and the length L of the cantilever. The input section 10 supplies a variety of input data and instruction data to the cantilever evaluation system 20.

The output section 15 is, for example, a display. The output section 15 outputs evaluation results calculated by the cantilever evaluation system 20. The evaluation results include simulated images and vibration analysis graphs.

The cantilever evaluation system 20 further includes a controller 21, a parameter storage 22, a fluid distribution data storage 23, a grid coordinate data storage 24, and a spot position storage 25. The controller 21 functions as control means for calculating the vibration characteristics of the cantilever C. The controller 21 executes a cantilever evaluation program. The controller 21 then functions as a parameter setting section 31, a forced-vibration setting section 32, a time step processing section 33, a combination computing section 34, a cantilever shape visualizing section 35, an amplitude analyzing section 36, and a reflected spot analyzing section 37. The controller 21 also functions as a proximal end displacement managing section and an object-to-be-computed identifying section.

The parameter storage 22 stores data on the parameters used in the cantilever evaluation simulation. That is, the parameter storage 22 is parameter data storing means. The parameters include physical property parameters and structural parameters. The physical property parameters include physical property values of the material constituting the cantilever C (the material density $\rho b$ and Young's modulus E) and fluid physical property values of the liquid (the liquid density $\rho L$ and the viscosity $\mu$). It is, for example, assumed that silicon is used as the material of the cantilever C and an aqueous solution containing biological molecules is used as the liquid. The physical property values of each of the materials is stored in advance.

The structural parameters are calculated based on the shape of the cantilever C. The cross-sectional area S(z) and the second moment of area I(z) of the cantilever C are used as the structural parameters.

The fluid distribution data storage 23 stores data on the fluid distribution of the liquid around the cantilever C. That is, the fluid distribution data storage 23 is fluid distribution data storing means. The fluid distribution data storage 23 expresses the fluid distribution at each of fluid grid points distributed along the coordinate z of the cantilever C for each time step by using a stream function $\psi$ and a vorticity equation. To this end, the fluid distribution data storage 23 stores a stream function value $\psi z(x, y; t)$ and vorticity $\omega z(x, y; t)$ at each of the fluid grid points expressed by the time step t and the coordinates x and y. Since the fluid is stationary at the time step t=0, the fluid distribution data storage 23 stores the stream function value $\psi z(x, y; t=0)$ and the vorticity $\omega z(x, y; t=0)$ both set at "zero." The combination computing section 34 uses boundary conditions according to the displacement $h(z; t)$ and the velocity $\partial h/\partial t(z; t)$ of the cantilever C along with the stream function value $\psi z(x, y; t)$ and the vorticity $\omega z(x, y; t)$ at the current time step t to calculate the stream function value $\psi z(x, y; t+1)$ and the vorticity $\omega z(x, y; t+1)$ at the subsequent time step. The combination computing section 34 stores the stream function value $\psi z(x, y; t+1)$ and the vorticity $\omega z(x, y; t+1)$ in the fluid distribution data storage 23.

The grid coordinate data storage 24 stores data on deformation of each grid coordinate of the cantilever C. That is, the grid coordinate data storage 24 is beam grid coordinate data storing means. The grid coordinate data storage 24 stores the displacement $h(z; t)$ and the velocity $\partial h/\partial t(z; t)$ of each of the grids distributed along the coordinate z of the cantilever C for each time step. At the time step t=0, the cantilever C is positioned at an initial height ho, and the grid coordinate data storage 24 stores the displacement $h(z; t)$ and the velocity $\partial h/\partial t(z; t)$ both set at "zero." The combination computing section 34 calculates the displacement $h(z; t)$ and the velocity $\partial h/\partial t(z; t)$ at the time step t and stores the calculated displacement $h(z; t)$ and velocity $\partial h/\partial t(z; t)$ in the grid coordinate data storage 24.

The spot position storage 25 stores the position of the spot of laser light outputted as a measurement signal from the scanning probe microscope. That is, the spot position storage 25 is spot position analysis result data storing means for storing data on the spot position. The spot position is where the laser light reflected off the distal end 12 of the cantilever impinges on a measurement surface. The spot position represents the coordinates on the set spot measurement surface for each forced-vibration frequency and time step. FIG. 13(a) shows a state in which a cantilever C1 is illuminated with laser light LL1 and the reflected laser light impinges on a spot measurement surface ST1. FIG. 13(b) shows a state in which a cantilever C2 is illuminated with laser light LL2 and the reflected laser light impinges on a spot measurement surface ST2. The reflected spot analyzing section 37 calculates the spot position and stores it in the spot position storage 25. The spot position is calculated from the displacement $h(z; t)$ and the inclination $\partial h/\partial z(z; t)$ of the distal end 12 of the cantilever.

The controller 21 will be described below in detail.

The parameter setting section 31 is parameter setting means for setting the parameters used in the simulation. The forced-vibration setting section 32 is forced-vibration setting means for applying a forced vibration to the proximal end 11 of the one-dimensional structure and storing the resultant displacement of the proximal end 11 in the grid coordinate data storage 24 for each time step. The time step processing section 33 is time step control means for repeatedly calculating the coordinate of each grid point to be computed. The combination computing section 34 is combination calculation means for identifying a grid point to be computed.

The parameter setting section 31 stores in the parameter storage 22 the physical property values of the material of the cantilever C and the liquid therearound acquired via the input section 10. The parameter setting section 31 stores a cross-sectional area calculation equation for calculating the cross-sectional area S(z) of the cantilever C and a second-moment-of area calculation equation for calculating the second moment of area I(z) for each shape of the cantilever C. The parameter setting section 31 calculates the cross-sectional area S(z) and the second moment of area I(z) of the cantilever C by substituting the width A and the height B of the cantilever into the calculation equations corresponding to the shape of the cantilever C. The calculated cross-sectional area S(z) and second moment of area I(z) are stored in the parameter storage 22.

The forced-vibration setting section 32 sets a forced vibration to be applied to the cantilever C. The forced-vibration setting section 32 supplies the thus set forced vibration to the combination computing section 34 as the boundary conditions so that the forced vibration is supplied to the proximal end 11 (Z=0) of the cantilever C. The forced-vibration setting section 32 acquires and holds the ranges (upper and lower limits) of the amplitude and frequency of the forced vibration via the input section 10. The forced-vibration setting section 32 successively supplies frequencies spaced apart by a predetermined frequency (1 kHz, for example) within the frequency range to the combination computing section 34.

The time step processing section 33 controls the time step used in the combination computing section 34.

The combination computing section 34 simultaneously calculates the fluid motion of the liquid around the cantilever C and the displacement at each coordinate along the cantilever C (the deflection of the cantilever C) when an action force resulting from the fluid motion or any other force acts on the cantilever C. The combination computing section 34 functions as a fluid motion calculating section 41, a fluid drag force calculating section 42, a tapping mode calculating section 43, and a beam deformation calculating section 44. The fluid motion calculating section 41, for each identified grid point, acquires the displacement of the grid point at the preceding time step from the grid coordinate data storage 24, uses the acquired displacement as the boundary conditions, and uses the fluid physical property values stored in the parameter storage 22 and the fluid distribution stored in the fluid distribution data storage to calculate the fluid distribution in a plane to be computed including the grid point to be computed. The fluid drag force calculating section 42, for each identified grid point, uses the calculated fluid distribution and the fluid physical property values stored in the parameter storage 22 to calculate a fluid drag force Fliq. The beam deformation calculating section 44, for each identified grid point, calculate the coordinate of the grid point to be computed by calculating the equation of motion for the one-dimensional structure using the fluid drag force Fliq, the structural parameters, and the material physical property values and then stores the coordinate of the grid point in the grid coordinate data storage 24.

The fluid motion calculating section 41 calculates the fluid motion of the liquid around the cantilever C. The fluid motion calculating section 41 stores the Navier-Stokes equations (equations (1) and (2) in FIG. 3) for calculating the stream function value $\psi z(x, y; t+1)$ and the vorticity $\omega z(x, y; t+1)$ at the time step t+1. The Navier-Stokes equations use difference calculus to provide a solution. The fluid motion calculating section 41 therefore uses the Navier-Stokes equations along with the boundary conditions according to the stream function value $\psi z(x, y; t)$, the vorticity $\omega z(x, y; t)$, and the displacement $h(z; t)$ and the velocity $\partial h/\partial t(z; t)$ of the cantilever C at the time step t to calculate the stream function value $\psi z(x, y; t+1)$ and the vorticity $\omega z(x, y; t+1)$ at the subsequent time step t+1.

The fluid drag force calculating section 42 calculates the fluid drag force Fliq acting on the cantilever C. The fluid drag force Fliq is calculated by adding the pressure that the liquid around the entire cantilever C exerts thereon to the viscous force. The fluid drag force calculating section 42 stores a fluid pressure calculation equation (3), a fluid viscous force calculation equation (4), and a fluid drag force calculation equation (5) shown in FIG. 3. The fluid pressure calculation equation (3) is used to calculate a pressure distribution PN along the surface of the cantilever C. The fluid viscous force calculation equation (4) is used to calculate a viscous force distribution PT along the surface of the cantilever C. The fluid drag force calculation equation (5) is used to integrate the sum of the pressure distribution PN and the viscous force distribution PT over the entire surface of the cantilever C.

Figure 7:
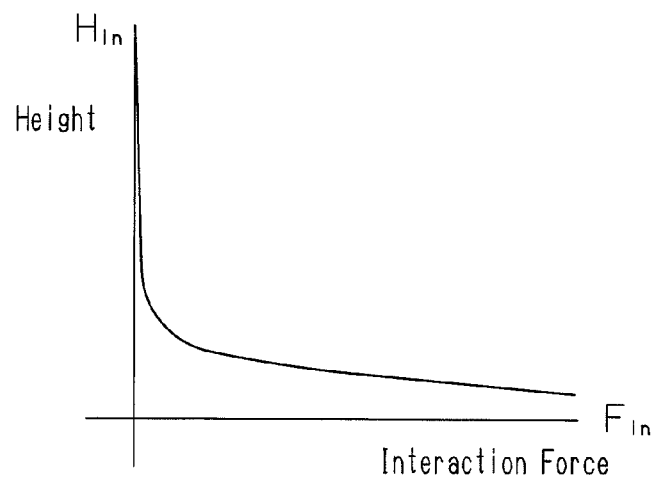
FIG. 7 is graph showing the relationship of the height of a probe at the distal end of the cantilever shown in FIG. 5 with an interaction force between the probe and the sample.

The tapping mode calculating section 43 is an action force calculating section for calculating an interaction force Fin in a tapping mode. In the tapping mode, the influence brought about when the probe 13 at the cantilever distal end 12 comes into contact with the surface of a sample is taken into consideration. The probe 13 detects a shape of the surface of the sample being measured, for example, by tapping the sample. The sample to be measured can, for example, be a protein. The cantilever C receives the interaction force Fin based on an intermolecular force from the sample or the substrate via the probe 13. The tapping mode calculating section 43 therefore stores an interaction force calculation equation for calculating the interaction force Fin. The interaction force Fin is a function of the probe height Hin and inversely proportional thereto, as shown in FIG. 7. Since the probe height Hin depends on the height of the distal end 12 of the cantilever C, the interaction force Fin is calculated by using the displacement $h(z)$ of the distal end 12. In the tapping mode, the tapping mode calculating section 43 acquires the displacement $h(z)$ of the cantilever distal end 12 ($z=L$) to calculate the interaction force Fin and supplies the interaction force Fin to the beam deformation calculating section 44.

Figure 4:
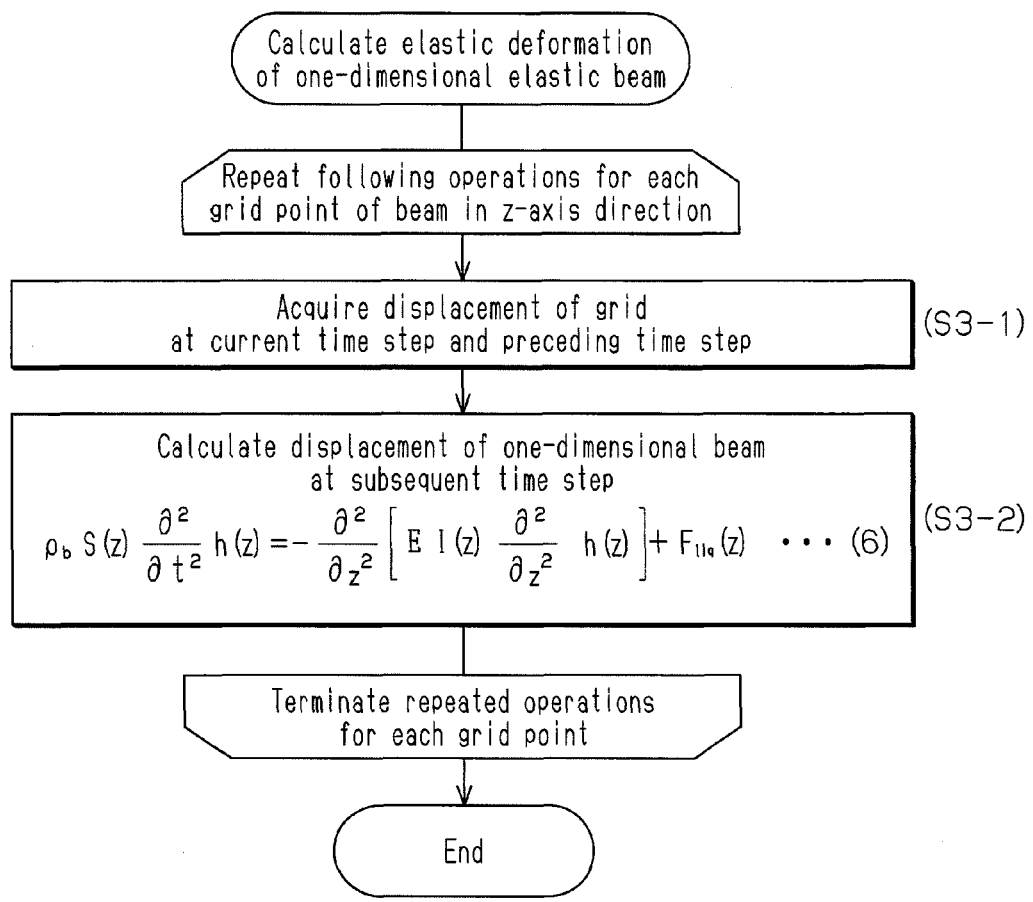
FIG. 4 is a flowchart of one-dimensional beam calculation shown in step S1-4 in FIG. 2.

The beam deformation calculating section 44 is a coordinate calculating section for calculating the deformation of the cantilever C, which is modeled into a one-dimensional beam. The beam deformation calculating section 44 calculates the displacement $h(z)$ and the velocity $\partial h/\partial t(z; t)$ at each grid of the cantilever C for each time step. To this end, the beam deformation calculating section 44 stores a displacement calculation equation (6) and a velocity calculation equation. FIG. 4 shows the displacement calculation equation (6). The velocity calculation equation is obtained by partially differentiating the displacement $h(z)$ with time (vat). The displacement calculation equation (6) and the velocity calculation equation are computed by using time-evolving difference calculus for the displacement $h(z)$ at the current time step and the displacement $h(z)$ at the preceding time step.

In the tapping mode, the beam deformation calculating section 44 computes the displacement calculation equation (6) by adding the interaction force Fin calculated by the tapping mode calculating section 43 to the right side of the displacement calculation equation (6).

The cantilever shape visualizing section 35 uses the displacement $h(z)$ and the velocity $\partial h/\partial t(z; t)$ for each time step to produce a simulated image and outputs it to the output section 15.

The amplitude analyzing section 36 is vibration amplitude analyzing means for analyzing the amplitude by using the displacement $h(z)$ and the inclination $\partial h/\partial z(z)$. That is, the amplitude analyzing section 36 is a frequency characteristic calculating section. The amplitude analyzing section 36 performs time change analysis of the height of the distal end 12 of the cantilever C, amplitude spectral analysis of the height of the distal end 12, and amplitude spectral analysis of the inclination $\partial h/\partial z$ of the distal end 12. The amplitude analyzing section 36 acquires data necessary for each of the analysis operations from the grid coordinate data storage 24 and produces analyzed data. The analyzed data help produce a graph that displays results of each of the analysis operations.

In the time change analysis of the height of the distal end 12 of the cantilever C, the amplitude analyzing section 36 acquires the displacement $h(z)$ of the cantilever C whenever time elapses, calculates the height of the distal end 12 of the cantilever C to which the initial height ho is added, and produces a graph that displays the time dependence of the height of the distal end 12 of the cantilever C.

In the amplitude spectral analysis of the height of the distal end 12 of the cantilever C, the amplitude analyzing section 36 acquires the amplitude of the cantilever distal end 12 in the steady state and produces a graph that displays the frequency characteristics of the amplitude.

In the amplitude spectral analysis of the inclination $\partial h/\partial z$ of the cantilever distal end 12, the amplitude analyzing section 36 acquires the inclination (deflection angle) $\partial h/\partial z$ of the cantilever distal end 12 in the steady state and produces a graph that displays the frequency characteristics of the inclination.

The amplitude analyzing section 36 responds to an analyzed result output instruction inputted via the input section 10 and outputs the corresponding analyzed results to the output section 15.

The reflected spot analyzing section 37 analyzes the spot position where the laser light as a measurement signal from the scanning probe microscope is reflected. The reflected spot analyzing section 37 stores data on the laser light exiting position (position relative to the cantilever C). The reflected spot analyzing section 37 stores a spot position calculation equation that uses the displacement $h(z=L)$ and the inclination $\partial h/\partial z(z=L)$ of the cantilever distal end 12, the position of the laser light, and the illumination direction to calculate the spot position where the laser light is reflected. The reflected spot analyzing section 37 acquires the displacement $h(z=L)$ of the cantilever distal end 12 from the grid coordinate data storage 24 and calculates the inclination $\partial h/\partial z(z=L)$ by using difference calculus. The reflected spot analyzing section 37 uses the displacement $h(z=L)$, the inclination $\partial h/\partial z(z=L)$, and the spot position calculation equation to calculate the spot position. The reflected spot analyzing section 37 stores the calculated spot position in the spot position storage 25.

Figure 2:
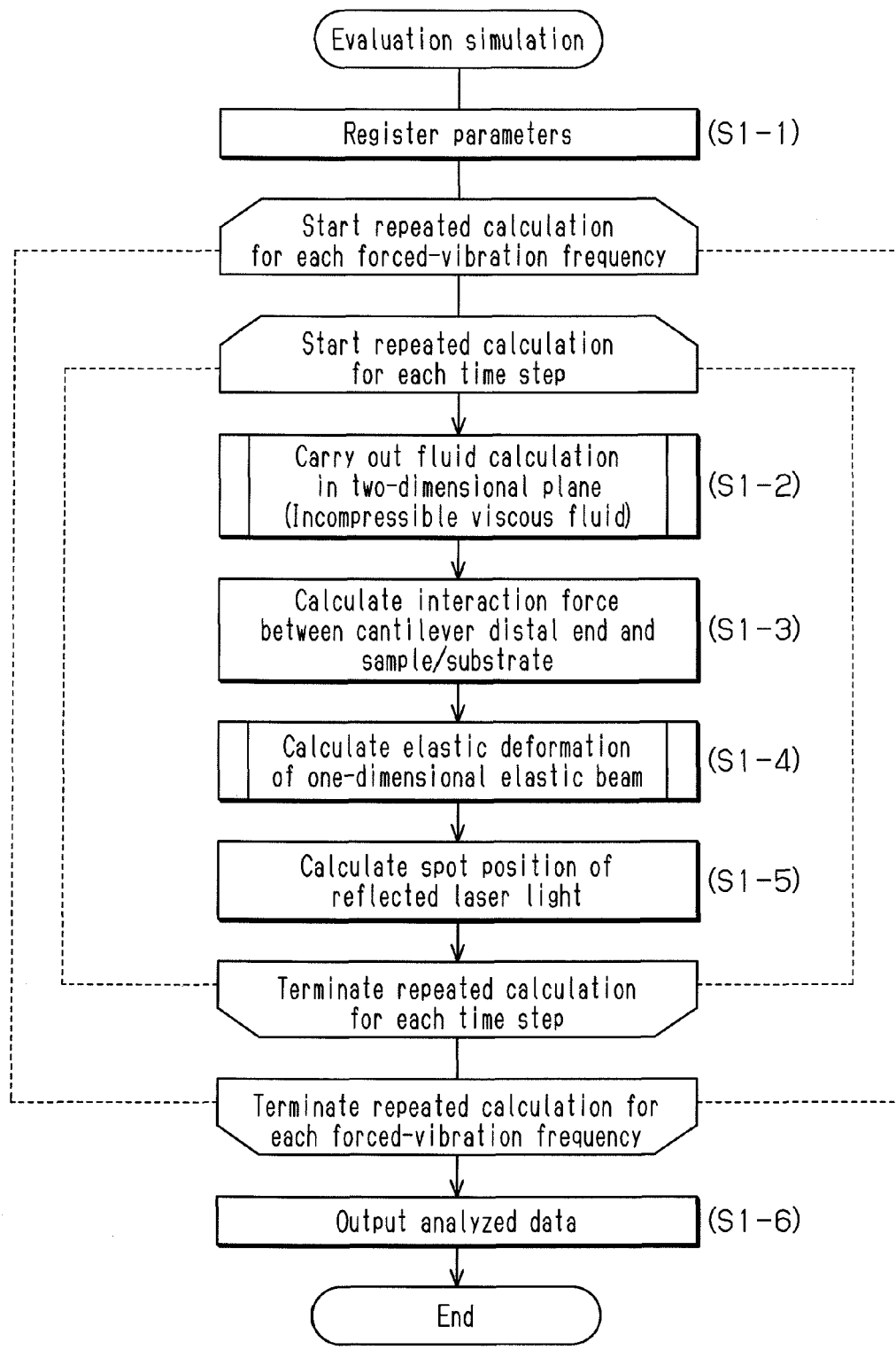
FIG. 2 is a flowchart of a cantilever evaluation simulation made by the cantilever evaluation system shown in FIG. 1.
Figure 3:
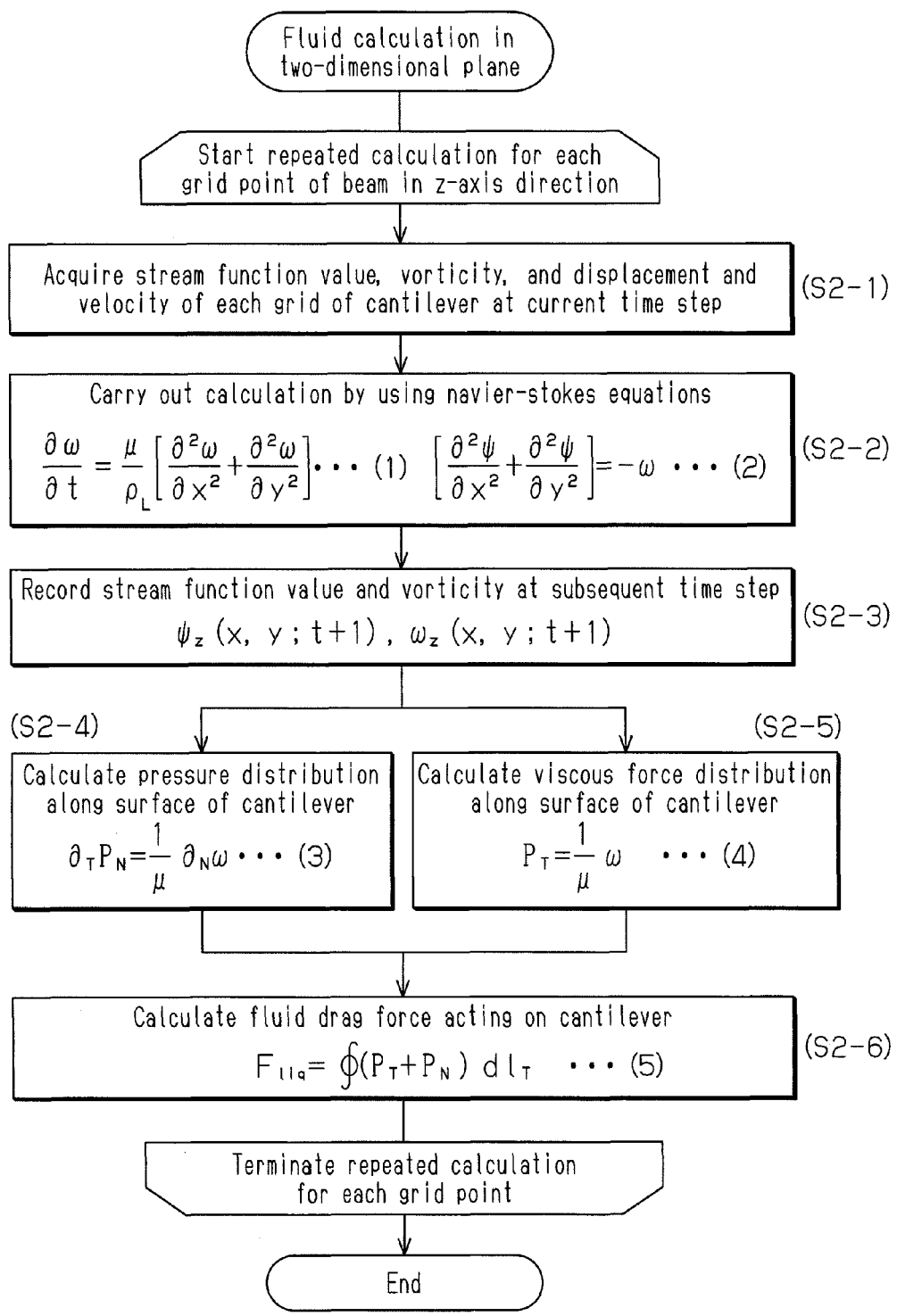
FIG. 3 is a flowchart of two-dimensional fluid calculation shown in step S1-2 in FIG. 2.

FIGS. 2 to 4 describe how the cantilever evaluation system 20 evaluates the motion of the cantilever C in a liquid when forced vibration is applied to the proximal end 11 of the cantilever C. In the present embodiment, the description will be made of evaluation performed in the tapping mode.

To evaluate the cantilever C, the controller 21 first activates the cantilever evaluation program. The cantilever evaluation program may be stored on a computer-readable recording medium. In this case, the controller 21 reads the cantilever evaluation program from the recording medium.

The controller 21 displays a simulation condition setting screen on the display based on the cantilever evaluation program. The simulation condition setting screen includes several input fields and a start button. The several input fields include a field to which the shape of the cantilever C is inputted, a field to which the upper and lower limits of the amplitude of the forced vibration are inputted, and a field to which the upper and lower limits of the frequency of the forced vibration are inputted. After the input fields receive inputs or items are set and the start button is pressed, the controller 21 carries out a parameter registration process (step S1-1). The controller 21 acquires the shape-related values of the cantilever C, the amplitude of the forced vibration, and the frequency of the forced vibration.

The parameter setting section 31 substitutes the shape-related values of the cantilever C into the cross-sectional area calculation equation and the second-moment-of-area calculation equation according to the shape of the cantilever C to calculate the cross-sectional area $S(z)$ and the second moment of area $I(z)$ of the cantilever C. The parameter setting section 31 stores the cross-sectional area $S(z)$ and the second moment of area $I(z)$ of the cantilever C in the parameter storage 22.

The combination computing section 34 changes the forced vibration for each of the frequencies set by the forced-vibration setting section 32 and repeats simulation calculation.

That is, the combination computing section 34 repeats the following processes for each time step set by the time step processing section 33.

The controller 21 carries out a fluid calculation process in two-dimensional planes (step S1-2). The fluid calculation process in two-dimensional planes will be specifically described with reference to FIG. 3. In the fluid calculation process, steps S2-1 to S2-6, which will be described below, are repeatedly carried out for each of the grid points of the beam in the Z-axis direction (planes to be computed).

In the fluid calculation process, the combination computing section 34 first acquires the stream function value $\psi z(x, y; t)$, the vorticity $\omega z(x, y; t)$, and the displacement $h(z; t)$ and the velocity $\partial h/\partial t(z; t)$ of the cantilever C at the current time step to identify the plane to be computed (step S2-1). That is, the fluid motion calculating section 41 acquires the stream function value $\psi z(x, y; t)$ and the vorticity $\omega z(x, y; t)$ at the current time step from the fluid distribution data storage 23. The fluid motion calculating section 41 acquires the displacement $h(z; t)$ and the velocity $\partial h/\partial t(z; t)$ of the cantilever C from the grid coordinate data storage 24.

The combination computing section 34 uses the Navier-Stokes equations to calculate the stream function value $\psi z(x, y; t+1)$ and the vorticity $\omega z(x, y; t+1)$ at the subsequent time step (step S2-2). That is, the fluid motion calculating section 41 first acquires the liquid density $\rho L$ and the viscosity $\mu$ from the parameter storage 22. The fluid motion calculating section 41 substitutes the boundary conditions according to the stream function value $\psi z(x, y; t)$, the vorticity $\omega z(x, y; t)$, and the displacement $h(z; t)$ and the velocity $\partial h/\partial t(z; t)$ of the cantilever C acquired in step S2-1 as well as the liquid density $\rho L$ and the viscosity $\mu$ to the Navier-Stokes equations. The stream function value $\psi z(x, y; t+1)$ and the vorticity $\omega z(x, y; t+1)$ at the subsequent time step are thus calculated.

The combination computing section 34 stores the stream function value $\psi z(x, y; t+1)$ and the vorticity $\omega z(x, y; t+1)$ at the subsequent time step (step S2-3). That is, the fluid motion calculating section 41 stores the stream function value $\psi z(x, y; t+1)$ and the vorticity $\omega z(x, y; t+1)$ at the calculated time step in the fluid distribution data storage 23.

The combination computing section 34 calculates the pressure distribution PN along the surface of the cantilever C (step S2-4). That is, the fluid drag force calculating section 42 acquires the viscosity $\mu$ of the fluid from the parameter storage 22 and acquires the corresponding stream function values $\psi z(x, y)$ from the fluid distribution data storage 23. The fluid drag force calculating section 42 substitutes the acquired viscosity $\mu$ and stream function values $\psi z(x, y)$ into the fluid pressure calculation equation (3) to calculate the pressure distribution PN.

The fluid drag force calculating section 42 calculates the viscous force distribution PT along the surface of the cantilever C (step S2-5). The fluid drag force calculating section 42 acquires the viscosity $\mu$ of the fluid from the parameter storage 22 and acquires the corresponding stream function values $\psi z(x, y)$ from the fluid distribution data storage 23. The fluid drag force calculating section 42 substitutes the acquired viscosity $\mu$ and stream function values $\psi z(x, y)$ into the fluid viscous force calculation equation (4) to calculate the viscous force distribution PT.

The combination computing section 34 calculates the fluid drag force Fliq acting on the cantilever C (step S2-6). That is, the fluid drag force calculating section 42 first acquires the cantilever length L from the parameter storage 22. The fluid drag force calculating section 42 substitutes the cantilever length L, the pressure distribution PN, and the viscous force distribution PT into the fluid drag force calculation equation (5) to calculate the fluid drag force Fliq acting on the entire cantilever C. The fluid drag force calculating section 42 supplies the fluid drag force Fliq to the beam deformation calculating section 44. The fluid calculation in the two-dimensional planes is temporarily terminated at this point.

As shown in FIG. 2, since the tapping mode is set, the combination computing section 34 calculates the interaction force Fin between the cantilever distal end 12 and the sample or the substrate (step S1-3). That is, the tapping mode calculating section 43 acquires the displacement h(z) of the cantilever distal end 12 (z=L) at the preceding time step from the grid coordinate data storage 24. The tapping mode calculating section 43 substitutes the acquired displacement h(z) into the interaction force calculation equation to calculate the interaction force Fin and supplies it the beam deformation calculating section 44.

FIG. 4 shows a flowchart of an elastic deformation calculation process. The controller 21 calculates elastic deformation of the one-dimensional elastic beam (step S1-4). In the elastic deformation calculation process, steps S3-1 to S3-2, which will be described below, are repeatedly carried out for each of the grid points of the beam in the Z-axis direction.

In the elastic deformation calculation process, the combination computing section 34 first acquires the displacement of each of the grids at the current time step and the preceding time step (step S3-1). That is, the beam deformation calculating section 44 acquires the displacement h(z) of each of the grids along the coordinate z at the current time step (t) and the preceding time step (t−1) from the grid coordinate data storage 24.

The beam deformation calculating section 44 calculates the displacement of the one-dimensional beam at the subsequent time step (step S3-2). That is, the beam deformation calculating section 44 first acquires the material density ρb and Young's modulus E of the cantilever C, and the cross-sectional area S(z) and the second moment of area I(z) of the cantilever C from the parameter storage 22. The beam deformation calculating section 44 substitutes the displacement h(z; t) of each of the grids acquired in step S3-1 into the displacement calculation equation to calculate the displacement h(z; t+1) of each of the grids at the subsequent time step. Since the tapping mode is set, the beam deformation calculating section 44 computes the displacement calculation equation (6) by adding the interaction force Fin to the right side of the displacement calculation equation.

The beam deformation calculating section 44 further substitutes the displacements h(z) acquired in step S3-1 into the velocity calculation equation to calculate the velocity ∂h/∂t (z) of each of the grids at the subsequent time step. The beam deformation calculating section 44 stores the calculated displacement h(z) and velocity ∂h/∂t(z) at each of the grids in the grid coordinate data storage 24.

The combination computing section 34 calculates the spot position of the reflected laser light (step S1-5). That is, the reflected spot analyzing section 37 acquires the displacement h(z=L) of the cantilever distal end 12 from the grid coordinate data storage 24. The reflected spot analyzing section 37 uses the acquired displacement h(z=L) to calculate the inclination ∂h/∂z(z=L). The reflected spot analyzing section 37 substitutes the displacement h(z=L) and the inclination ∂h/∂z(z=L) into the spot position calculation equation to calculate the spot position and stores it in the spot position storage 25. That is, the reflected spot analyzing section 37 functions not only as a distal end inclination angle calculating section but also as a reflected spot position calculating section. One time step process is thus completed.

The controller 21 repeatedly carries out steps S1-2 to S1-5 for each time step. That is, when the time step processing section 33 completes the calculation for all the grid points in one time step, the processes are carried out for the grid points at the subsequent time step by incrementing the time step by "1".

When the calculated time step is greater than the last time step, the subsequent forced-vibration frequency is set. That is, the forced-vibration setting section 32 adds the predetermined frequency (increment) to the forced-vibration frequency set to calculate the subsequent forced-vibration frequency and supplies it to the combination computing section 34.

When the calculated forced-vibration frequency is greater than the forced-vibration upper limit, the controller 21 outputs the analyzed results (step S1-6). That is, the cantilever shape visualizing section 35, the amplitude analyzing section 36, and the reflected spot analyzing section 37 calculate data on the respective analyzed data and output them to the output section 15.

(Analyzed Results)

Figure 8:
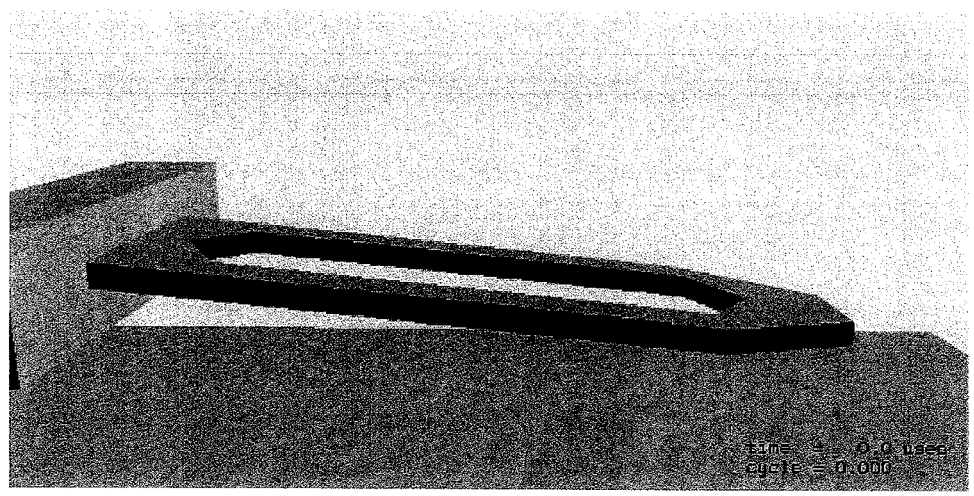
FIG. 8 is a simulated photograph obtained by analyzing the vibration of a cantilever in an aqueous solution.
Figure 9:
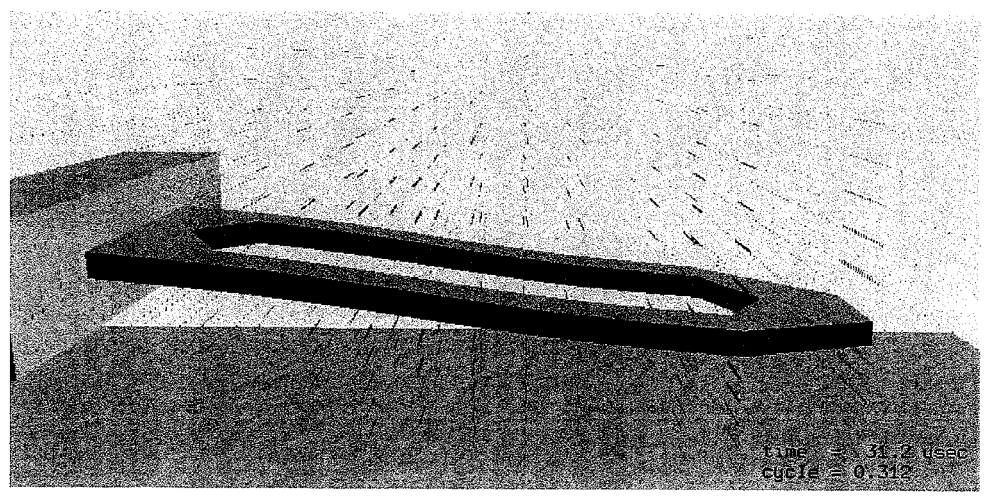
FIG. 9 is a simulated photograph after a certain period has elapsed from the point of time in FIG. 8.
Figure 10:
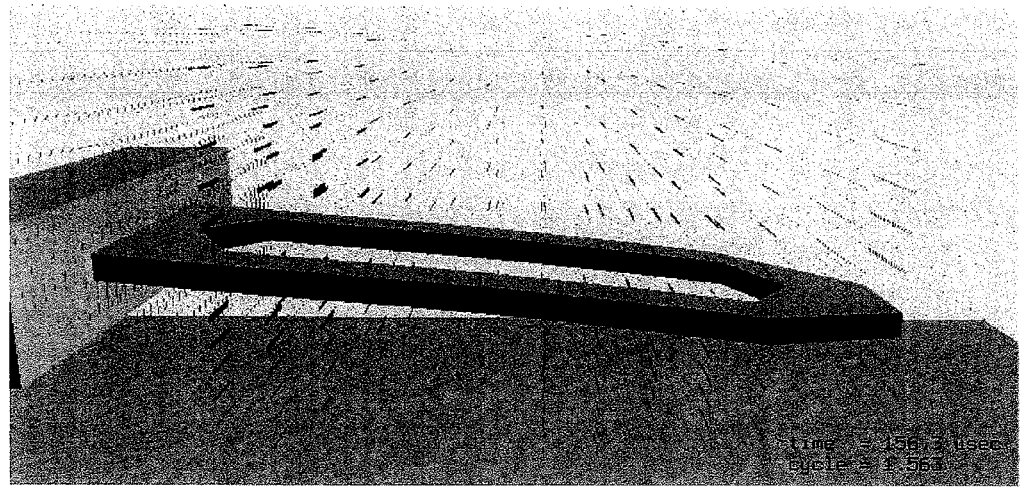
FIG. 10 is a simulated photograph after a certain period has elapsed from the point of time in FIG. 9.
Figure 11:
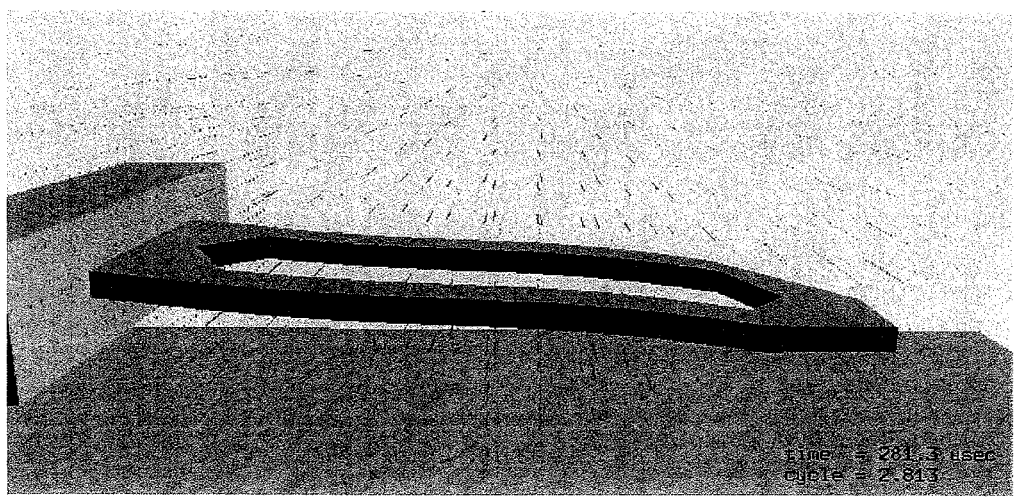
FIG. 11 is a simulated photograph after a certain period has elapsed from the point of time in FIG. 10.
Figure 12:
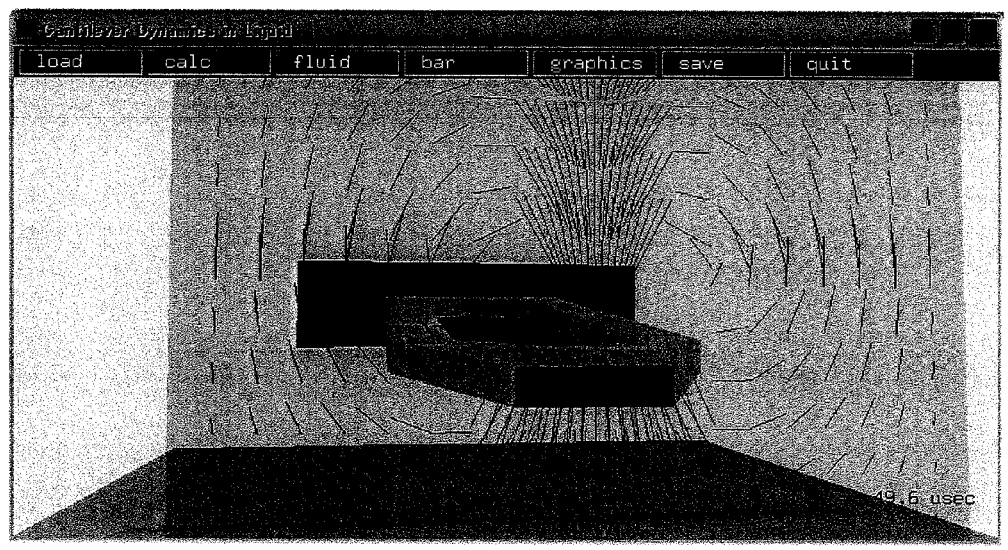
FIG. 12 is a simulated photograph viewed in a direction different from that in FIG. 11.

The cantilever shape visualizing section 35 displays video images representing the behavior of the cantilever C on the display. FIGS. 8 to 12 show exemplary still images representing the behavior of the cantilever C at respective specific points of time. FIGS. 8 to 11 show the behavior of the cantilever C in the order of observing time starting from the initiation of forced vibration. FIG. 12 shows the cantilever C viewed in a direction different from that in FIG. 11. FIG. 8 shows the cantilever C in its initial state. FIGS. 9 to 12 show the deformed cantilever C at the respective points of time in consideration of the displacement in the X direction and the inclination ∂h/∂z at each coordinate. FIGS. 9 to 12 also show the motion vector of the fluid around the cantilever C.

As shown in FIG. 14, the amplitude analyzing section 36 displays on the display the temporal change in height of the distal end 12 of the cantilever C for different forced-vibration frequencies. In FIG. 14, the forced-vibration frequencies supplied to the proximal end 11 of the cantilever C are 5 kHz, 10 kHz, and 15 kHz.

Figure 15:
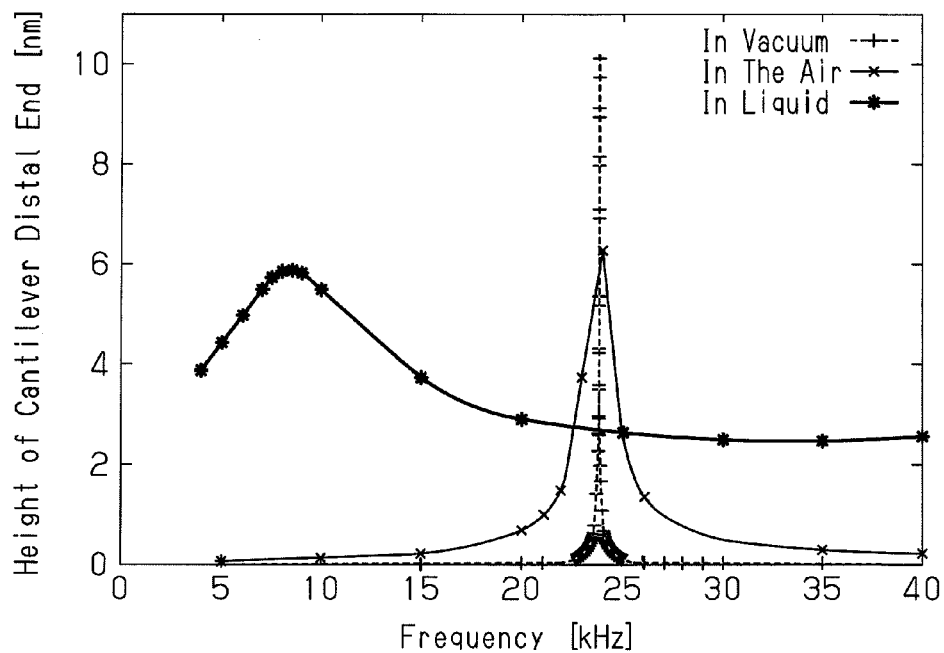
FIG. 15 shows graphs representing amplitude spectra of the height of the cantilever distal end in vacuum, air, and liquid environments.

As shown in FIG. 15, the amplitude analyzing section 36 is a frequency characteristic output section for displaying on the display an amplitude spectrum of the height of the distal end 12 of the cantilever C in a liquid. FIG. 15 also shows the amplitude spectra of the height of the distal end 12 of the cantilever C in vacuum and atmospheric environments.

Figure 16:
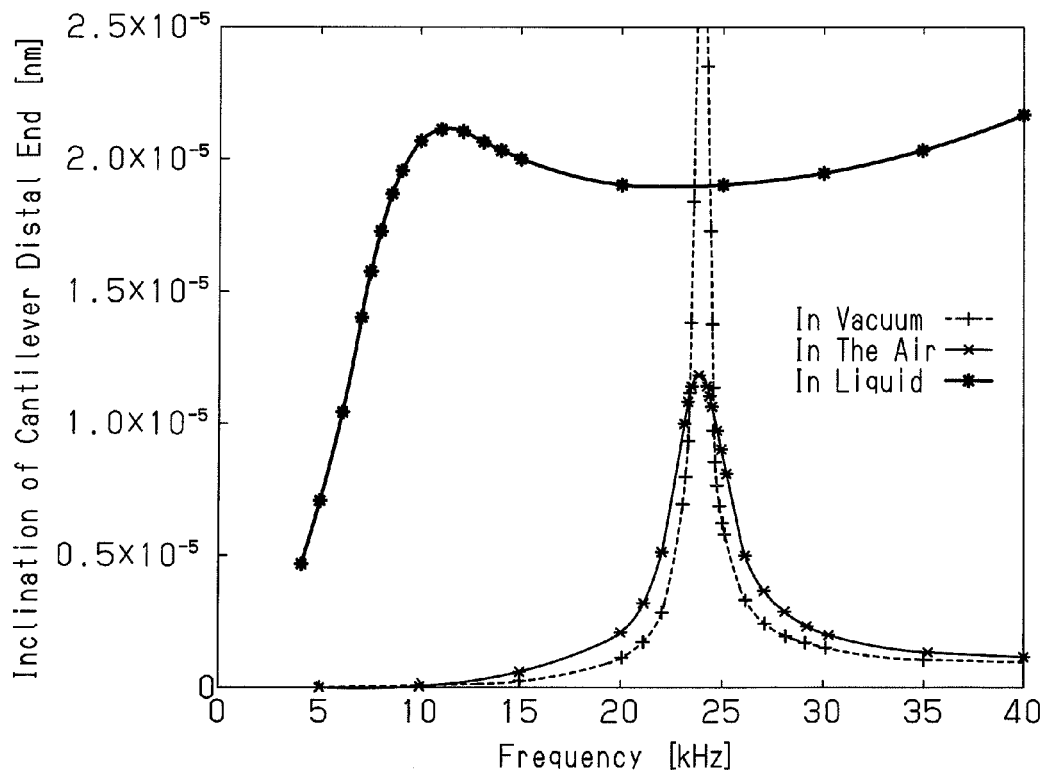
FIG. 16 shows graphs representing amplitude spectra of the inclination of the cantilever distal end in vacuum, air, and liquid environments.

As shown in FIG. 16, the amplitude analyzing section 36 displays on the display an amplitude spectrum of the inclination ∂h/∂z of the cantilever distal end 12 in a liquid. FIG. 16 also shows amplitude spectra of the inclination ∂h/∂z of the cantilever distal end 12 in vacuum and atmospheric environments.

That is, the controller 21 models the cantilever C into a one-dimensional structure. The controller 21 further models the fluid around the cantilever C in such a way that the fluid behaves in a plurality of two-dimensional planes. Each of the two-dimensional planes is perpendicular to the longitudinal direction of the cantilever C. The two-dimensional planes contain respective grid points distributed in the longitudinal direction of the cantilever C. The controller 21 stores in the grid coordinate data storage 24 the amplitude of the proximal end 11 of the cantilever C at each time step produced when a forced vibration is applied to the one-dimensional structure. For each time step and grid point, the controller 21 uses the displacement at the preceding time step as the boundary conditions. The controller 21 calculates the fluid distribution in a plane to be computed containing the corresponding grid point by using the physical property values of the fluid and the fluid distribution at a past point in time. The controller 21 uses the calculated fluid distribution and the physical property values of the fluid to calculate the fluid drag force Fliq. The controller 21 uses the fluid drag force Fliq, the structural parameters, and the material physical property values to calculate the equation of motion for the one-dimensional structure. The controller 21 then calculates the coordinate of the grid point to be computed and stores it in the grid coordinate data storage 24. The controller 21 repeatedly carries out the stepwise processes described above for each of the grid points.

The present embodiment provides the following advantages.

1. The controller 21 carries out the fluid calculation process in two-dimensional planes (step S1-2). The controller 21 uses the boundary conditions according to the acquired stream function value $\psi z(x, y; t)$, vorticity $\omega z(x, y; t)$, and displacement $h(z; t)$ and velocity $\partial h/\partial t(z; t)$ of the cantilever C to calculate the stream function value $\psi z(x, y; t+1)$ and the vorticity $\omega z(x, y; t+1)$ at the subsequent time step (step S2-3). The controller 21 uses the calculated stream function value $\psi z(x, y)$ and vorticity $\omega z(x, y)$ to calculate the fluid drag force Fliq acting on the cantilever C. The controller 21 calculates elastic deformation of the one-dimensional elastic beam (step S1-4). The controller 21 substitutes the calculated fluid drag force Fliq into the displacement calculation equation to calculate the displacement $h(z; t+1)$ of the one-dimensional beam at the subsequent time step (step S3-2). Steps S1-2 and S1-4 are repeated for each grid point (for each plane to be computed) and further repeated for each time step.

That is, the following two operations are alternately repeated. The displacement $h(z; t)$ of the cantilever C is used as the boundary conditions to calculate the stream function value $\psi z(x, y; t+1)$ and the vorticity $\omega z(x, y; t+1)$, and the fluid drag force Fliq calculated from the above stream function value $\psi z(x, y; t+1)$ and vorticity $\omega z(x, y; t+1)$ is used to calculate the displacement $h(z; t+1)$ of the cantilever C. That is, the following two operations are alternately repeated. The deformation of the cantilever is used as the boundary conditions to calculate the fluid distribution, and the calculated fluid drag force Fliq is used to calculate the deformation of the cantilever.

Since the equation taking into account the influence of the cantilever C on the liquid and the equation taking into account the influence of the liquid on the cantilever C are thus simultaneously solved, a comprehensive numerical simulation including the behavior of the cantilever C and the behavior of the fluid therearound can be made. Since the liquid is modeled in two-dimensional planes perpendicular to the modeled one-dimensional cantilever C, three-dimensional behavior can be simulated as a whole. As a result, the simulation allows the behavior of the cantilever C to be evaluated, and the evaluation can help design a cantilever C capable of highly precise measurement and analyze a measurement signal in consideration of the deformation of the cantilever C. Since the cantilever C is modeled into a one-dimensional structure and the fluid is modeled into a two-dimensional structure in the present embodiment, the calculation is much easier than that required for a three-dimensional model. The calculation load can be thus reduced.

2. The beam deformation calculating section 44 uses the displacement calculation equation (6) to calculate the deformation of the cantilever C. The displacement calculation equation (6) contains the structural parameters (the cross-sectional area $S(z)$ and the second moment of area $I(z)$) of the cantilever C. The cross-sectional area $S(z)$ and the second moment of area $I(z)$ are calculated from parameters (width and height) on the shape of the cantilever C in directions different from the one-dimensional direction along which the cantilever C is modeled. Since the two-dimensional elements in the directions different from the modeled one-dimensional direction therefore also affect the calculation of the cantilever C, three-dimensional behavior can be accurately simulated as a whole.

3. The controller 21 calculates the interaction force Fin between the distal end 12 and the sample or the substrate (step S1-3). In the process of calculating elastic deformation of the one-dimensional elastic beam (step S1-4), the controller 21 computes the displacement calculation equation by adding the calculated interaction force Fin to the right side of the displacement calculation equation (6). It is therefore possible to make a comprehensive numerical simulation including not only the behavior of the cantilever C and the behavior of the liquid therearound, but also the interaction force Fin that the probe 13 receives from the sample or the substrate.

4. The controller 21 calculates the spot position of the reflected laser light (step S1-5). The controller 21 substitutes the displacement $h(z=L)$ and the inclination $\partial h/\partial z(z=L)$ of the cantilever distal end 12 into the spot position calculation equation to calculate the spot position. For example, even when the displacement $h(z=L)$ shows the same value, the inclination $\partial h/\partial z(z=L)$ may show different values, as indicated by the cantilever C1 shown in FIG. 13(*a*) and the cantilever C2 shown in FIG. 13(*b*). The spot position of the reflected laser light LL1 differs from that of the reflected laser light LL2. Since the reflected laser light forms a measurement signal from the scanning probe microscope, the measurement signal can be accurately acquired by using the inclination $\partial h/\partial z(z=L)$ to calculate and accurately recognize the spot position of the laser light.

5. The controller 21 sets a forced vibration applied to the cantilever C. The forced-vibration setting section 32 successively supplies the combination computing section 34 with frequencies spaced apart by a predetermined frequency within amplitude and frequency ranges of the specified forced vibration. After the calculation is carried out for a single frequency all the way to the last time step, the forced-vibration setting section 32 adds the predetermined frequency (increment) to the current frequency to calculate the subsequent forced-vibration frequency and supplies it to the combination computing section 34. The cantilever evaluation system 20 can therefore automatically produce the time dependence and the amplitude spectrum of the height of the distal end 12 of the cantilever C when different forced vibrations are applied, whereby the cantilever C can be evaluated.

6. The cantilever shape visualizing section 35 displays video images representing the behavior of the cantilever C on the display based on the simulation results. The behavior of the cantilever C and the fluid can therefore be recognized in the form of video images.

7. As the analyzed results, the amplitude analyzing section 36 displays on the display the temporal change in height of the distal end 12 of the cantilever C for different forced-vibration frequencies, as shown in FIG. 14. FIG. 14 shows that the amplitude of the distal end 12 changes with the forced-vibration frequency supplied to the proximal end 11 of the cantilever C. That is, the numerical simulation in the present embodiment has been made in a satisfactory manner.

8. The amplitude analyzing section 36 displays on the display the amplitude spectrum of the height of the distal end 12 of the cantilever C in a liquid, as shown in FIG. 15. FIG. 15 shows that the resonant peak of the cantilever C in a liquid is duller than that of the cantilever C in a vacuum or atmospheric environment. That is, the numerical simulation in the present embodiment has been made in a satisfactory manner.

9. As the analyzed results, the amplitude analyzing section 36 displays on the display the amplitude spectrum of the inclination ∂h/∂z of the cantilever distal end 12 in a liquid, as shown in FIG. 16. FIG. 16 shows that the inclination ∂h/∂z of the cantilever distal end 12 in a liquid increases as the frequency increases.

The embodiment described above may be modified as follows.

The evaluation simulation is not limited to evaluating the tapping mode. That is, the process in step S1-3 may be changed or omitted. The simulation condition setting screen displayed on the display may include a field in which a user can choose whether or not the user wants to use the tapping mode.

The controller 21 does not necessarily calculate the spot position of the reflected laser light for each time step in step S1-5. The controller 21 may alternatively calculate the spot positions of the reflected laser light all together when the analyzed results are outputted (step S1-6).

The controller 21 does not necessarily successively increment the forced-vibration frequency applied to the cantilever C by a fixed amount before supplying it to the combination computing section 34. The controller 21 may automatically change the forced-vibration frequency. For example, the amount by which the forced-vibration frequency is incremented may be smaller in the vicinity of the resonant frequency of the cantilever C than those in the other areas. In the vicinity of the resonant frequency, the phase difference between the amplitude of the proximal end 11 of the cantilever C and that of the distal end 12 of the cantilever C is "π/2". Using this fact, the controller 21 estimates the resonant frequency of the cantilever C from the phase difference between the displacement of the proximal end 11 of the cantilever C and that of the distal end 12 of the cantilever C. In the vicinity of the resonant frequency, the simulation is made at a forced-vibration frequency that is increased by a small amount. That is, the forced-vibration setting section 32 stores data on the phase difference range within which the simulation is made at a frequency that is increased by a small amount. The forced-vibration setting section 32 uses the waveform representing the vibration of the height of the proximal end 11 of the cantilever C and the representing the waveform of vibration of the height of the distal end 12 of the cantilever C to calculate the phase difference between the vibrations, and compares the calculated phase difference with the phase difference range to identify a frequency within the phase difference range. In a predetermined range in the vicinity of the resonant frequency, the forced-vibration setting section 32 sets frequencies spaced apart by a small increment (0.2 kHz, for example) and supplies them to the combination computing section 34. For example, the predetermined range in the vicinity of the resonant frequency is set at the range between the set frequency lower than the identified frequency and the set frequency higher than the identified frequency. The controller 21 can automatically analyze the amplitude at each frequency in the vicinity of the resonant frequency in detail.

The function of the simulation condition setting screen outputted when the cantilever evaluation program is activated is not limited to setting the shape of the cantilever C, the amplitude of forced vibration, and the frequency range of forced vibration. The simulation condition setting screen may allow the user to set the physical property values of the material of the cantilever C and those of the fluid. Alternatively, the cantilever evaluation system 20 may hold a physical property constant table in which material names are associated with the physical property values of the materials, and the physical property values of the material used in a simulation may be determined in accordance with a specified material name.

The cantilever evaluation system 20 can evaluate the cantilever C in air (gas) as well as the cantilever C in a liquid.

While the invention has been described in detail and with reference to specific embodiments thereof, it will be apparent to one skilled in the art that various changes and modifications can be made therein without departing from the spirit and scope thereof.

The invention claimed is:

1. A cantilever evaluation system for evaluating a cantilever in a fluid, the cantilever having a proximal end and a distal end, the system comprising a parameter storage, a grid coordinate data storage, a fluid distribution data storage, a memory and a controller, wherein:

the parameter storage stores a structural parameter based on the shape of the cantilever, a material physical property value of the material of the cantilever, and a fluid physical property value of fluid around the cantilever;

the grid coordinate data storage stores data on displacement of each grid point, the grid points distributed along the longitudinal direction of a one-dimensional structure into which the cantilever is modeled;

the fluid distribution data storage stores data on the two-dimensional distribution of the fluid in each of a plurality of vertical planes for each of a plurality of time steps and each of grid points of the cantilever, the vertical planes each containing one or more of the grid points and being perpendicular to the longitudinal direction;

the controller calculates vibration characteristics of the cantilever, wherein a proximal end displacement managing section, an object-to-be-computed identifying section, a fluid motion calculating section, a fluid drag force calculating section, a coordinate calculating section, and a time step processing section are stored in the memory in order to be executed by the controller;

the proximal end displacement managing section stores displacement of a proximal end of the cantilever produced when a forced vibration is applied to the proximal end in the grid coordinate data storage for each of the plurality of time steps, the plurality of time steps including a preceding time step and a subsequent time step in which order time elapses;

the object-to-be-computed identifying section identifies a grid point to be computed from the plurality of grid points, the vertical plane containing the grid point to be computed being a plane to be computed, wherein, for the identified grid point, the fluid motion calculating section acquires the displacement of the grid point at the preceding time step from the grid coordinate data storage, uses the acquired displacement as a boundary condition, and uses the fluid physical property value and the corresponding two-dimensional fluid distribution stored in the fluid distribution data storage to calculate the two-dimensional fluid distribution in the plane to be computed by using Navier-Stokes equations and stores the calculated two-dimensional fluid distribution as the two-dimensional fluid distribution in the subsequent time step, the fluid drag force calculating section uses the two-dimensional fluid distribution in the plane to be computed and the fluid physical property value to calculate a fluid drag force, the coordinate calculating section calculates the coordinate of the grid point to be computed by using the fluid drag force, the structural parameter, and the material physical property value to calculate the equation of motion for the one-dimensional structure, and stores the calculated coordinate in the grid coordinate data storage, and the time step processing section causes the fluid motion calculating section, the fluid drag force calculating section, and the coordinate calculating section to repeatedly calculate the coordinate for each grid point to be computed.

2. The cantilever evaluation system according to claim 1, wherein a forced-vibration setting section and a frequency characteristic calculating section are further stored in the memory in order to be executed by the controller, the forced-vibration setting section successively changes the frequency of the forced-vibration, and the frequency characteristic calculating section calculates the amplitude of a distal end of the cantilever for each of the frequencies and outputs the frequency characteristics of the vibration of the distal end.

3. The cantilever evaluation system according to claim 1, wherein a distal end of the cantilever is provided with a probe, a sample to be measured is placed on a substrate, the probe is used to tap the sample to be measured, an action force calculating section being further stored in the memory in order to be executed by the controller, the action force calculating section calculates an action force that the probe receives at the grid point of the distal end from at least one of the sample to be measured and the substrate, and the controller calculates the equation of motion for the one-dimensional structure with the action force acting thereon.

4. The cantilever evaluation system according to claim 1, a distal end inclination angle calculating section and a reflected spot position calculating section being further stored in the memory in order to be executed by the controller, the distal end inclination angle calculating section uses the coordinate of the grid point of a distal end of the cantilever and the coordinate of the grid point adjacent to the grid point of the distal end to calculate the inclination angle of the distal end, and the reflected spot position calculating section uses the coordinate of the grid point of the distal end and the inclination angle of the distal end to identify the reflection path of laser light with which the grid point of the distal end is illuminated so as to calculate the position of the reflected laser spot.

5. A cantilever evaluation method for causing a computer to calculate vibration characteristics of a cantilever, the computer including a parameter storage, a grid coordinate data storage, and a fluid distribution data storage, the method comprising:

storing in the parameter storage a structural parameter based on the shape of the cantilever, a material physical property value of the material of the cantilever, and a fluid physical property value of fluid around the cantilever;

storing data on displacement of each grid point in the grid coordinate data storage, the grid points distributed along the longitudinal direction of a one-dimensional structure into which the cantilever is modeled;

storing data on the two-dimensional distribution of the fluid in each of a plurality of vertical planes in the fluid distribution data storage for each of a plurality of time steps and each of grid points of the cantilever, the vertical planes each containing one or more of the grid points and being perpendicular to the longitudinal direction;

storing displacement of a proximal end of the cantilever produced when a forced vibration is applied to the proximal end in the grid coordinate data storage for each of the plurality of time steps, the plurality of time steps including a preceding time step and a subsequent time step in which order time elapses;

identifying a grid point to be computed from the plurality of grid points, the vertical plane containing the grid point to be computed being a plane to be computed;

the method further including, for the identified grid point:

acquiring the displacement of the grid point at the preceding time step from the grid coordinate data storage, using the acquired displacement as a boundary condition, and using the fluid physical property value and the corresponding two-dimensional fluid distribution stored in the fluid distribution data storage to calculate the two-dimensional fluid distribution in the plane to be computed by using Navier-Stokes equations;

storing the calculated two-dimensional fluid distribution as the two-dimensional fluid distribution in the subsequent time step;

using the two-dimensional fluid distribution in the plane to be computed and the fluid physical property value to calculate a fluid drag force;

calculating the coordinate of the grid point to be computed by using the fluid drag force, the structural parameter, and the material physical property value to calculate the equation of motion for the one-dimensional structure, and storing the calculated coordinate in the grid coordinate data storage; and repeatedly calculating the coordinate for each grid point to be computed.

6. A non-transitory computer readable recording medium storing cantilever evaluation program causing a computer to calculate vibration characteristics of a cantilever, the computer including a parameter storage, a grid coordinate data storage, and a fluid distribution data storage, the cantilever evaluation program causing the computer to carry out:

storing in the parameter storage a structural parameter based on the shape of the cantilever, a material physical property value of the material of the cantilever, and a fluid physical property value of fluid around the cantilever;

storing data on displacement of each grid point in the grid coordinate data storage, the grid points distributed along the longitudinal direction of a one-dimensional structure into which the cantilever is modeled;

storing data on the two-dimensional distribution of the fluid in each of a plurality of vertical planes in the fluid distribution data storage for each of a plurality of time steps and each of grid points of the cantilever, the vertical planes each containing one or more of the grid points and being perpendicular to the longitudinal direction;

storing displacement of a proximal end of the cantilever produced when a forced vibration is applied to the proximal end in the grid coordinate data storage for each of the plurality of time steps, the plurality of time steps including a preceding time step and a subsequent time step in which order time elapses;

identifying a grid point to be computed from the plurality of grid points, the vertical plane containing the grid point to be computed being a plane to be computed;

the program further causing the computer to carry out, for the identified grid point:

acquiring the displacement of the grid point at the preceding time step from the grid coordinate data storage, using the acquired displacement as a boundary condition, and using the fluid physical property value and the corresponding two-dimensional fluid distribution stored in the fluid distribution data storage to calculate the two-dimensional fluid distribution in the plane to be computed by using Navier-Stokes equations;

storing the calculated two-dimensional fluid distribution as the two-dimensional fluid distribution in the subsequent time step;

using the two-dimensional fluid distribution in the plane to be computed and the fluid physical property value to calculate a fluid drag force;

calculating the coordinate of the grid point to be computed by using the fluid drag force, the structural parameter, and the material physical property value to calculate the equation of motion for the one-dimensional structure, and storing the calculated coordinate in the grid coordinate data storage; and repeatedly calculating the coordinate for each grid point to be computed.

* * * * *